(12) United States Patent
Tichy et al.

(10) Patent No.: US 11,724,576 B2
(45) Date of Patent: Aug. 15, 2023

(54) INFRARED WELDED LIFTGATE ASSEMBLY AND PROCESS OF MAKING SAME

(71) Applicant: Magna Exteriors Inc., Concord (CA)

(72) Inventors: Stanislav Tichy, Troy, MI (US); Mark P. Birka, Northville, MI (US); Riad Chaaya, Clarkston, MI (US); Paul Hasl, Liberec (CZ)

(73) Assignee: Magna Exteriors Inc., Aurora (CA)

( * ) Notice: Subject to any disclaimer, the term of this patent is extended or adjusted under 35 U.S.C. 154(b) by 138 days.

(21) Appl. No.: 16/486,686

(22) PCT Filed: Feb. 16, 2018

(86) PCT No.: PCT/IB2018/050976
§ 371 (c)(1),
(2) Date: Aug. 16, 2019

(87) PCT Pub. No.: WO2018/150376
PCT Pub. Date: Aug. 23, 2018

(65) Prior Publication Data
US 2020/0009949 A1 Jan. 9, 2020

Related U.S. Application Data

(60) Provisional application No. 62/459,928, filed on Feb. 16, 2017.

(51) Int. Cl.
*B60J 5/04* (2006.01)
*B29C 65/14* (2006.01)
(Continued)

(52) U.S. Cl.
CPC ............ *B60J 5/042* (2013.01); *B29C 65/1412* (2013.01); *B29C 65/48* (2013.01); *B29C 66/71* (2013.01);
(Continued)

(58) Field of Classification Search
CPC .......... B60J 5/042; B60J 5/0484; B60J 5/101
(Continued)

(56) References Cited

U.S. PATENT DOCUMENTS 8,403,399 B2 * 3/2013 Kuntze .................... B60J 5/107
296/146.8
8,894,128 B2 * 11/2014 Barral .................. B62D 29/005
296/146.6
(Continued)

FOREIGN PATENT DOCUMENTS

CA 2939079 A1 8/2015
CN 105980181 A 9/2016
(Continued)

OTHER PUBLICATIONS http://www.forwardtech.com/plastic-assembly/infrared-welders/infrared-vs-other-welding-methods (Year: 2021).*
(Continued)

*Primary Examiner* — Hilary L Gutman
(74) *Attorney, Agent, or Firm* — Warn Partners, P.C.

(57) ABSTRACT

A liftgate assembly having finished show surfaces, and process of manufacturing same. The liftgate assembly includes local reinforcements that are overmolded to first reinforcements, and the first reinforcements are infrared welding to a first panel. Second and third reinforcements are also infrared welded to the first panel. To infrared weld the respective reinforcements to the first panel in predetermined locations with respect to the first panel, nesting structures are provided to hold the respective reinforcements and first panel. At least one infrared heating fixture heats various predetermined surfaces on the reinforcements and first panel, and the parts are then pressed together for joining the predetermined surfaces of the respective parts together. The process is repeated, if needed, until all of the reinforcements (Continued)

are infrared welded to the first panel. Outer panels are bonded to the second and third reinforcements.

12 Claims, 8 Drawing Sheets

(51) Int. Cl.
*B29C 65/48* (2006.01)
*B29C 65/00* (2006.01)
*B60J 5/10* (2006.01)
*B29K 509/08* (2006.01)
*B29L 31/30* (2006.01)
*B29L 31/00* (2006.01)

(52) U.S. Cl.
CPC .... *B29C 66/7212* (2013.01); *B29C 66/73921* (2013.01); *B29C 66/919* (2013.01); *B29C 66/91413* (2013.01); *B29C 66/929* (2013.01); *B29C 66/949* (2013.01); *B60J 5/0484* (2013.01); *B60J 5/101* (2013.01); *B29K 2509/08* (2013.01); *B29L 2031/30* (2013.01); *B29L 2031/778* (2013.01)

(58) Field of Classification Search
USPC ....................................... 296/146.6
See application file for complete search history.

(56) References Cited

U.S. PATENT DOCUMENTS

| | | | | |
|---|---|---|---|---|
| 8,991,898 | B2 * | 3/2015 | Iwano | B60J 5/0429 |
| | | | | 296/146.6 |
| 9,963,021 | B2 * | 5/2018 | Miyake | B62D 29/001 |
| 10,029,410 | B2 * | 7/2018 | Chaaya | B29C 65/1432 |
| 10,059,178 | B2 * | 8/2018 | Miyake | B60S 1/0441 |
| 10,384,520 | B2 * | 8/2019 | Kuntze | B60J 5/101 |
| 10,723,209 | B2 * | 7/2020 | Chiba | B60J 5/0481 |
| 10,899,202 | B2 * | 1/2021 | Kuntze | B60J 5/107 |
| 11,198,255 | B2 * | 12/2021 | Huotari | B29C 66/3452 |
| 2008/0030047 | A1 * | 2/2008 | Munenaga | B60J 5/101 |
| | | | | 296/146.6 |
| 2010/0314902 | A1 | 12/2010 | Leterrier et al. | |
| 2011/0272954 | A1 * | 11/2011 | Gonin | B62D 25/08 |
| | | | | 293/120 |
| 2012/0248814 | A1 * | 10/2012 | Tsukiyama | B60J 5/101 |
| | | | | 296/146.8 |
| 2012/0280533 | A1 * | 11/2012 | Gachter | B60J 5/107 |
| | | | | 296/146.8 |
| 2014/0110964 | A1 * | 4/2014 | Schijve | B60J 5/0427 |
| | | | | 296/146.6 |
| 2016/0236721 | A1 * | 8/2016 | Nakamura | B62D 25/06 |
| 2016/0236722 | A1 * | 8/2016 | Nakamura | B62D 25/06 |
| 2016/0347155 | A1 | 12/2016 | Kuntze et al. | |
| 2017/0174055 | A1 * | 6/2017 | Demange | B60J 5/042 |
| 2018/0104904 | A1 * | 4/2018 | Chaaya | B29C 66/114 |
| 2019/0184799 | A1 * | 6/2019 | Kerschbaum | B29C 45/14336 |
| 2019/0366813 | A1 * | 12/2019 | Grond-Soons | B60J 5/101 |
| 2019/0375465 | A1 * | 12/2019 | Coudron | B62D 27/06 |
| 2021/0016723 | A1 * | 1/2021 | Rajon | B60J 5/107 |

FOREIGN PATENT DOCUMENTS

| | | | | |
|---|---|---|---|---|
| DE | 102012003599 | A1 | | 10/2012 |
| EP | 2374644 | A1 | | 10/2011 |
| FR | 2908067 | A1 * | 5/2008 | ....... B29C 45/14631 |
| FR | 2945480 | A1 * | 11/2010 | ............. B60J 5/107 |
| FR | 2985494 | A1 * | 7/2013 | ........... B62D 29/008 |
| FR | 3028238 | A1 * | 5/2016 | ............. B60J 5/107 |
| FR | 3094924 | A1 * | 10/2020 | ............ B60J 5/0437 |
| FR | 3094944 | A1 * | 10/2020 | ............ B60J 5/0431 |
| WO | 2015123295 | A1 | | 8/2015 |
| WO | 2015123312 | A1 | | 8/2015 |
| WO | 2016087806 | A1 | | 6/2016 |
| WO | 2016/187441 | A1 | | 11/2016 |
| WO | 2017130064 | A1 | | 8/2017 |
| WO | WO-2018108252 | A1 * | 6/2018 | ....... B29C 45/14336 |
| WO | WO-2019137130 | A1 * | 7/2019 | ............ B60J 5/0481 |
| WO | WO-2020020615 | A1 * | 1/2020 | ............. G06F 30/15 |
| WO | WO-2020097172 | A1 * | 5/2020 | ............. B60J 5/101 |
| WO | WO-2020257666 | A1 * | 12/2020 | ....... B29C 45/14631 |
| WO | WO-2020257682 | A1 * | 12/2020 | ............. B60J 5/107 |

OTHER PUBLICATIONS http://www.forwardtech.com/plastic-assembly/infrared-welders/infrared-welding-process-advantages (Year: 2021).*
International Search Report for International Application No. PCT/IB2018/050976 , Filed Feb. 16, 2018.
Supplementary European Search Report for EP Application No. EP 18754060 dated Jan. 28, 2020.

* cited by examiner

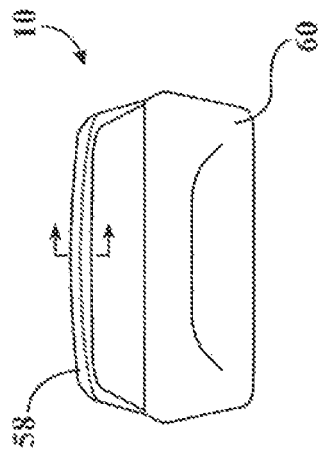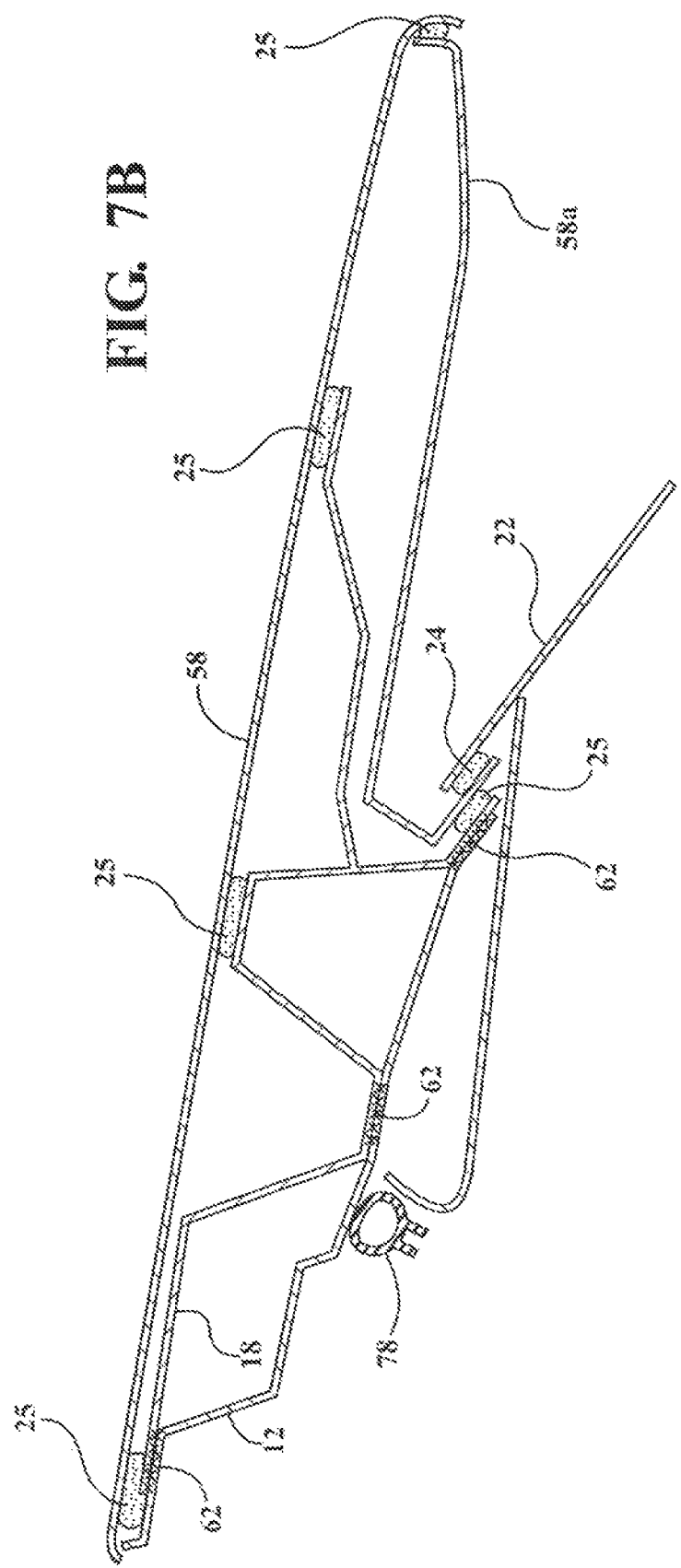

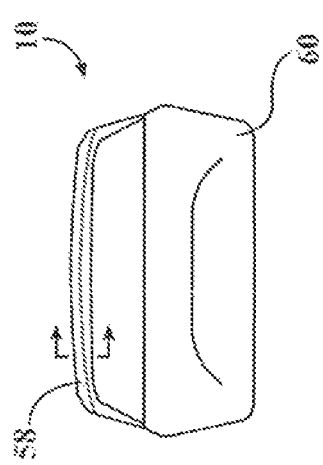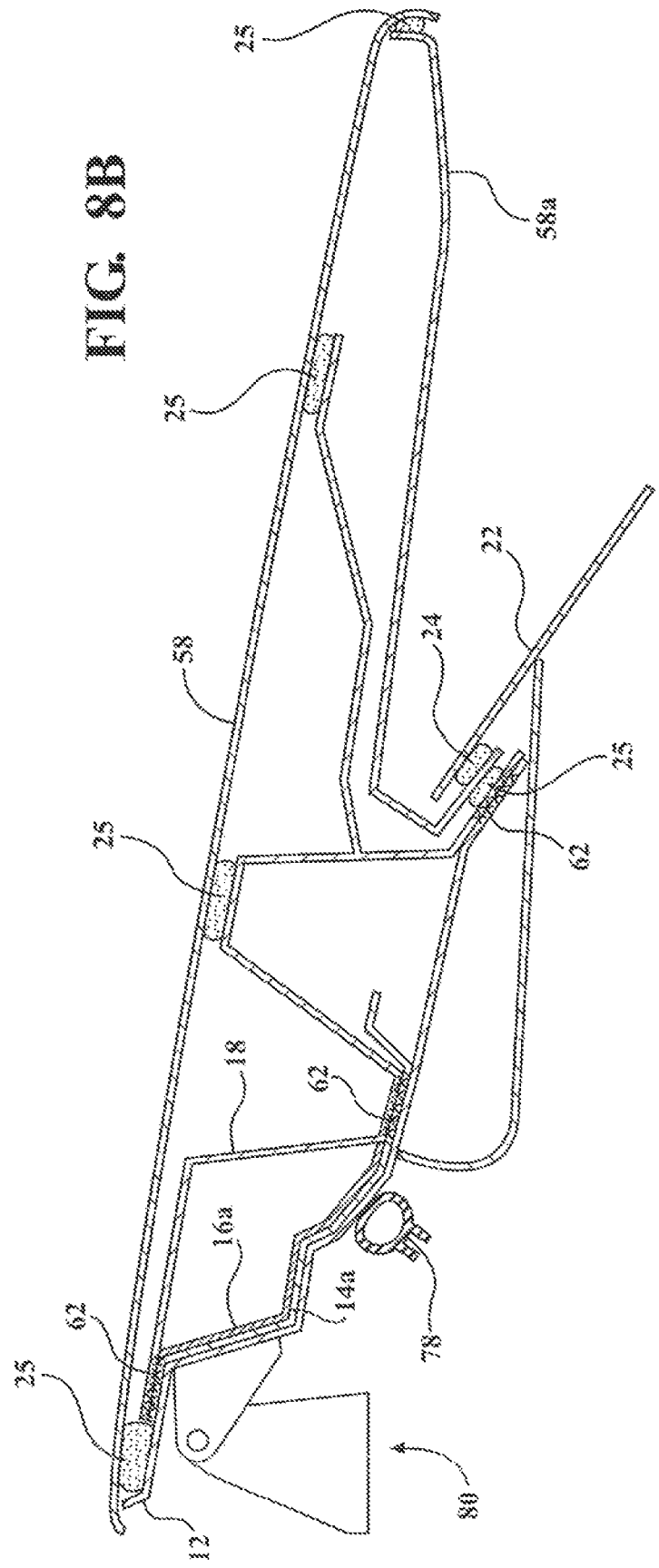

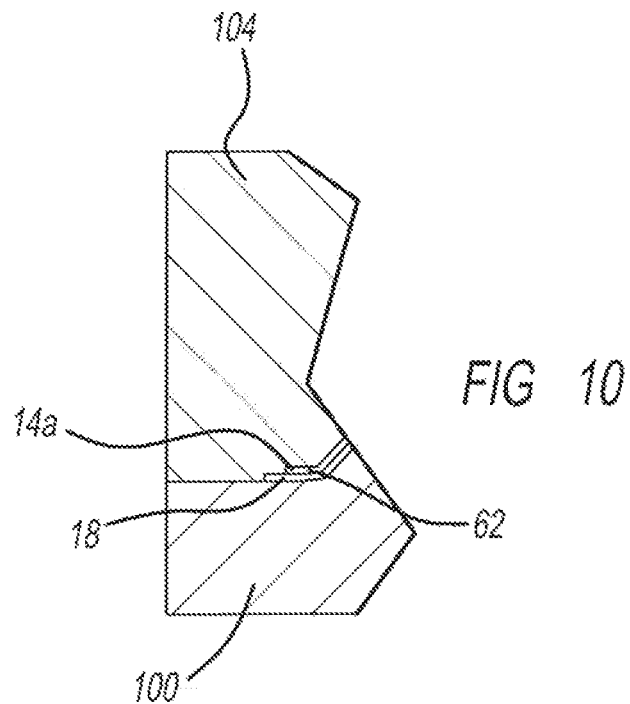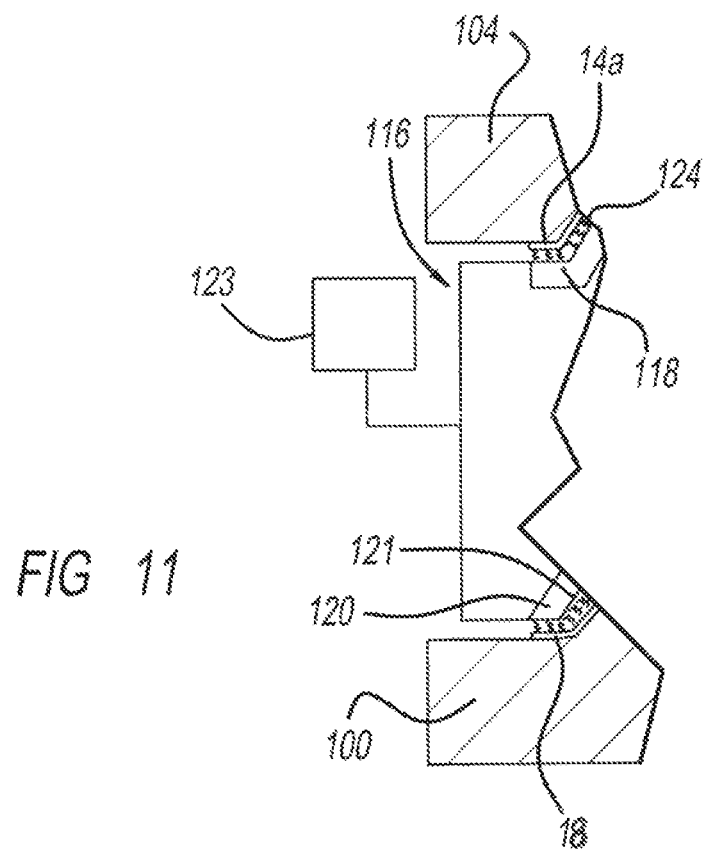

INFRARED WELDED LIFTGATE ASSEMBLY AND PROCESS OF MAKING SAME

CROSS-REFERENCE TO RELATED APPLICATIONS

This application is a National Stage of PCT International Application No. PCT/IB2018/050976, filed Feb. 16, 2018, which claiming priority to claims the benefit of U.S. Provisional Patent Application No. 62/459,928, filed Feb. 16, 2017. The disclosures of the above applications are incorporated herein by reference.

FIELD OF THE INVENTION

The present invention relates to an exterior panel assembly for vehicles and method of making same. More specifically, to a liftgate assembly for vehicles and method of manufacture.

BACKGROUND OF THE INVENTION

The automotive industry sets predetermined performance criteria depending on the application, e.g., fuel economy, durability, strength, crash performance, tensional requirements, noise, vibration, or harshness, etc. One of the current trends in the automobile industry is to try to lower mass and investment costs. However, many current liftgates use metal reinforcements that are either mechanically attached (e.g., with rivets, screws, etc) to the inner panel or are overmolded to the inner panel directly. Neither option provides good sectional properties for achieving high performance criteria. In addition, when overmolded to the inner panel directly, the metallic reinforcements tend to be larger in an attempt to meet performance criteria. This is counterproductive to another goal of lowering component weight.

One of the trends in the automobile industry is to lower vehicle weight to help achieve better fuel economy, thus helping to meet fuel economy standards and to offset the higher fuel prices. Sport utility and crossover vehicles remain popular, and these typically include fairly heavy such as rear liftgates and other exterior panel assemblies, making these parts of the vehicle a target area for weight reduction. Such parts as liftgates for any vehicle are traditionally made from stamped steel panels that are heavy and have a high tooling cost. Traditional steel liftgates are expensive investments, heavy, take up a lot of OEM floor space in areas from the stamping plant, body shop, paint shop, and trim line. Further, steel liftgates have limited styling flexibility, take a lot of time to tool, and have corrosion concerns. Acrylonitrile Butadiene Styrene (ABS) is an alternative for larger parts because ABS is not as heat sensitive or is not back-side read through prone. Sheet Molding Compound (SMC) is an alternative to steel for the inner and outer panels of the liftgate. Using SMC has several manufacturing concerns related to the material and process. Steel and SMC liftgates have a mass penalty over thermoplastics. There are also styling restrictions with traditional sheet metal components.

Thermoplastic polyolefin (TPO)—filled TPO (e.g., glass filled) or non-filled TPO—is another alternative material to steel and SMC but it is a difficult material to work with. TPO has been used for some parts but is thought of as being difficult to use because it is too soft, sensitive, flexible or difficult to process for making larger parts. The use of TPO has generally been limited to smaller parts. TPO has not been used for liftgate panels or other large exterior panels. TPO parts have also been generally limited to being welded first before painting Class A surfaces, which adds processing steps.

In accordance with the present invention it is desirable to develop new manufacturing techniques for creating a liftgate, or any other vehicle part, that provides sufficient strength, yet maintains or presents a desirable "Class-A" finish. Multiple parts of any exterior body assembly must be joined together.

Accordingly, for all these reasons, there exists a need for a liftgate assembly that is lighter weight, has lower investment costs, has good surface appearance and that meets or exceeds higher industry performance criteria, and a method for manufacturing a liftgate assembly that eliminates or reduces the problems or concerns associated with conventional systems.

SUMMARY OF THE INVENTION

The present invention generally relates to an exterior body panel assembly and process for manufacturing same, including a plurality of first reinforcements, e.g., side reinforcements, with overmolded local reinforcements, e.g., a plurality of metal reinforcements. The plurality of first reinforcements are infrared welded to at least a first panel, e.g., inner panel, of the assembly. In addition, at least one second reinforcement, e.g., upper reinforcement panel, is infrared welded to at least the first panel. Additionally, at least one third reinforcement, e.g., lower reinforcement panel, is infrared welded to at least the first panel. The the infrared welding creates the structure needed to achieve predetermined requirements, depending on the particular application, and creates the structure needed to meet or exceed other welding methods and bonding. The infrared welding also allows for more shapes, depending on the application, improved joint geometries, an improved condition to reduce or eliminate read through on Class "A" surfaces, improved strength and continuous weld(s) that are water tight and creates a seal.

Furthermore, by overmolding the local reinforcements to the side first reinforcements, the local reinforcements can be made smaller. This is significant for weight reduction, especially when the local reinforcements are steel. It also improves sectional properties to meet and exceed predetermined industry requirements, e.g., high tensional requirements, noise, vibration, and harshness (NVH) requirements. The present invention's properties are better with the overmolding being separate for infrared welding to the first panel, compared to comparable systems, then if the metal was overmolded directly to the inner panel.

At least one first outer panel, e.g., spoiler with finish show surface, and at least one second outer panel, e.g., lower outer panel with finished show surface, are bonded with adhesive to the second and third reinforcement panels, respectively. Alternatively, or additionally, the first outer panel is mechanically attached to the second reinforcement panel, and, the second outer panel is mechanically attached to the third reinforcement panel.

The present invention generally provides an assembly for a vehicle, e.g., motor vehicle, electric vehicle, automobile, sport utility vehicle, etc., including at least one localized reinforcement affixed to at least one reinforcement, optionally, in combination with infrared welding the at least one reinforcement to at least one panel. Optionally, the at least one panel is operably affixable to at least one other panel, preferably, the at least one other panel including a Class A surface. Optionally, the at least one panel is an inner panel.

Optionally, the at least one other panel is an outer panel. The at least one localized reinforcement is preferably metal, most preferably, steel. Optionally, the present invention also generally provides overmolding of the at least one localized reinforcement, preferably, overmolding the at least one localized reinforcement to the at least one reinforcement. Optionally, the at least one other panel is affixed to the at least one panel and/or to the at least one reinforcement and/or to the at least one localized reinforcement. The present invention includes an assembly and includes the process of manufacturing the assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7A is a rear elevation view of a liftgate assembly, in accordance with the present invention;

FIG. 7B is a sectional view taken at FIG. 7A illustrating the second reinforcement connected to the first panel and the second reinforcement connected to the first outer panel, in accordance with the present invention;

FIG. 8A is a rear elevation view of a liftgate assembly, in accordance with the present invention;

FIG. 8B is a sectional view taken at FIG. 8A illustrating the first reinforcement panel and the second reinforcement connected to the first panel and the second reinforcement panel connected to the first outer panel, in accordance with the present invention;

FIG. 9 is a front elevation view of the first panel on a first tool nest, in accordance with the present invention;

FIG. 10 is a front elevation view of the first panel against the first tool nest and a reinforcement against a second tool, in accordance with the present invention; and FIG. 11 is a front elevation view an exemplary infrared welding fixture with at least one infrared heat source heating the adjacent first panel in the first tool, and with at least one infrared heat source heating the adjacent second panel held by the second tool nest, in accordance with the present invention.

DETAILED DESCRIPTION OF THE PREFERRED EMBODIMENTS

Figure 1:
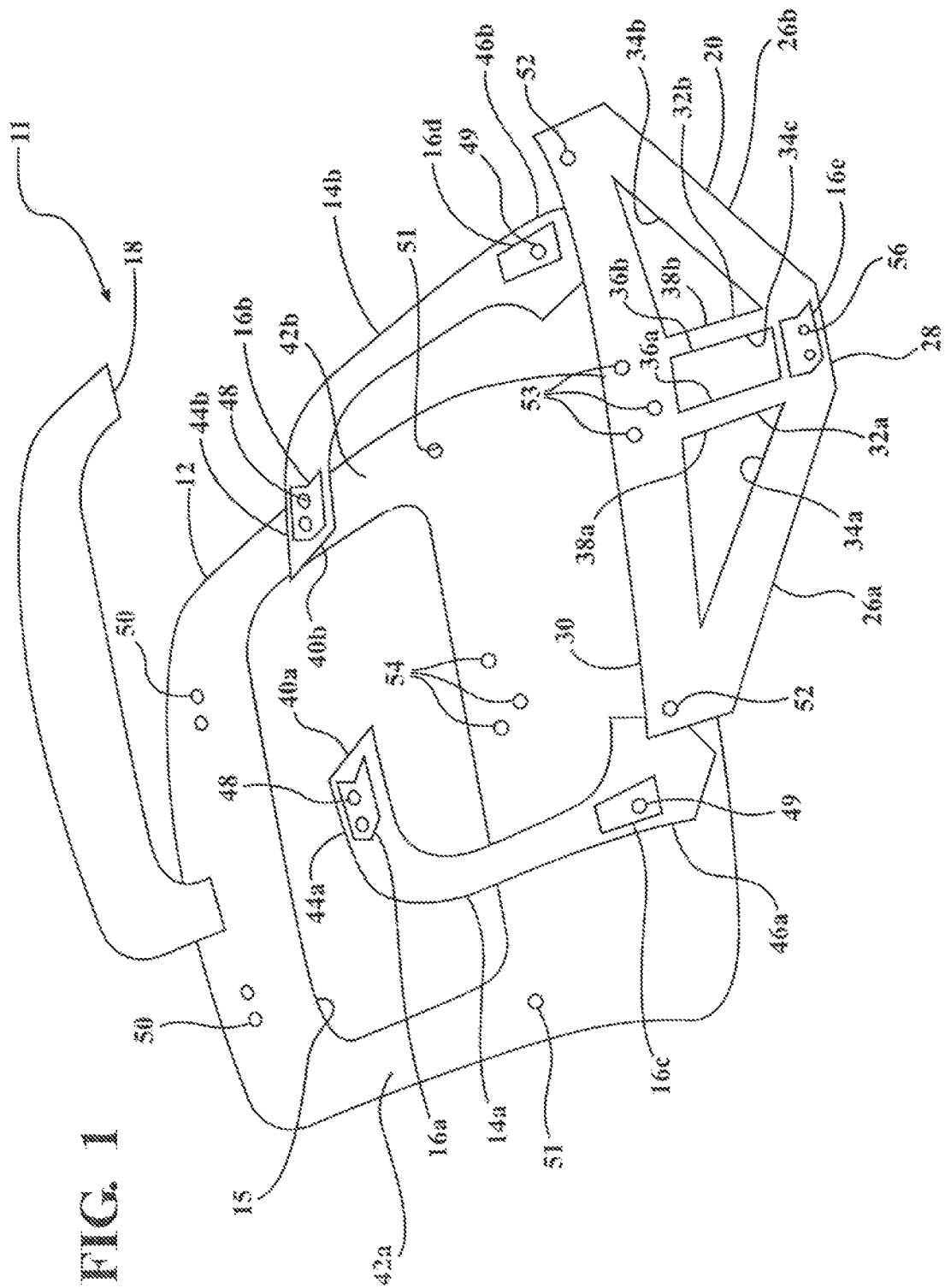
FIG. 1 is an exploded perspective view of a liftgate subassembly of a liftgate assembly, in accordance with the present invention.

The following description of the preferred embodiment(s) is merely exemplary in nature and is in no way intended to limit the invention, its application, or uses.

Referring to the figures generally, the present invention generally provides an assembly including at least one localized reinforcement affixed to at least one reinforcement in combination with infrared welding the at least one reinforcement to at least one panel. The at least one panel is affixable to at least one other panel, preferably, the at least one other panel including a Class A surface. The present invention also generally provides the combination of overmolding of localized reinforcements to reinforcements and infrared welding of components. The present application is directed to the assembly and to the process of manufacturing the assembly.

While a liftgate assembly is depicted throughout the figures and described herein, it is understood that it is within the scope of the present invention for the exterior body panel assembly to be any type of vehicle component, including, but not limited to, a front end carrier assembly, door assembly, hood assembly, bumper assembly, quarter panel assembly, roof assembly, tailgate assembly, any multi-piece construction or any other type of body assembly, e.g., exterior body assembly, of any kind, in particular, but not limited to, those including at least one panel having a Class-A surface, painted finished surface, painted thermoplastic component, and/or molded-in color or otherwise finished part surface, etc.

Referring to FIGS. 1-8B generally, there is depicted a liftgate assembly shown generally at 10 including a liftgate subassembly shown generally at 11 that includes at least one first panel 12, preferably, at least one first panel 12 that is an inner panel; at least one first reinforcement 14a, preferably, a pair of first reinforcements 14a, 14b, more preferably, at least one pair of first reinforcements 14a, 14b that are side reinforcements, most preferably, a pair of first reinforcements 14a, 14b that are side reinforcements to an opening 15 in the at least one first panel 12; at least one local reinforcement 16a, typically, a plurality of local reinforcements 16a, preferably, at least one pair of local reinforcements 16a, 16b, more preferably, at least one pair of local reinforcements 16a, 16b that are upper reinforcements, more preferably, at least one pair of local reinforcements 16a, 16b that are upper reinforcements and at least one second pair of local reinforcements 16c, 16d; and, most preferably, further includes at least one second reinforcement 18, typically, at least one second reinforcement that is an upper panel reinforcement 18, preferably, at least one second reinforcement that is an outer panel reinforcement 18, more preferably, at least one second reinforcement 18 that is an upper outer panel reinforcement, most preferably, at least one second reinforcement 18 that is a spoiler reinforcement; and, most preferably, further includes at least one third reinforcement 20, typically, at least one third reinforcement 20 that is a lower panel reinforcement, preferably, at least one third reinforcement 20 that is an outer panel reinforcement, more preferably, at least one third reinforcement 20 that is a lower outer panel reinforcement, most preferably, at least one third reinforcement 20 that is a lower outer Class A panel reinforcement.

Preferably, the at least one second reinforcement 18 is generally 'U' like shaped, most preferably, generally 'U' like shaped with ends projecting generally toward the rear of the vehicle in the vehicle installed position. It is understood that any other profiles or shapes suitable for providing reinforcement depending on the application is contemplated without departure from the scope of the present invention.

The opening 15 of the at least one first panel 12 generally is sized to provide the rear window opening for viewing at the rear of the vehicle. A window 22 of predetermined material, preferably, tempered auto window glass, is operably connected to cover the opening 15. Preferably, adhesive 24 connects the window 22, more preferably, adhesive near the perimeter of the window 22 adheres the window 22 in the assembly 10. Most preferably, the adhesive 24 couples the window 22 to at least the pair of side reinforcements 14a, 14b, and/or the second reinforcement 18, and/or the third reinforcement 20, and/or at least one trim part 68.

Preferably, the at least one third reinforcement 20 is generally triangle like shaped, most preferably, including at least one pair of members 26a, 26b that are angled, in opposite directions, from at least one shorter member 28, preferably at a lower end, to at least one longer member 30, preferably, a longer member 30 spanning generally horizontally toward the top of the at least one third reinforcement 20. It is understood that any other profiles or shapes suitable for providing reinforcement depending on the application is contemplated without departure from the scope of the present invention. Preferably, at least one additional member 32a, which is preferably centrally located, is connected to the shorter member 28 and longer member 30. The at least one additional member 32a is preferably a pair of additional members 32a, 32b that are generally parallel to each other and extend generally transverse to the longer member 30. It is understood that any other profiles or shapes suitable for providing reinforcement depending on the application is contemplated without departure from the scope of the present invention.

Preferably, at least one opening 34a, most preferably, a plurality of openings 34a are provided in the at least one third reinforcement 20, which additionally advantageously helps to reduce material costs and weight. Preferably, at least three openings 34a are provided. More preferably, the at least one opening 34a is a pair of openings 34a, 34b that are generally triangular shaped, e.g., right triangle, and, optionally, an additional opening 34c, which additional opening 34c is preferably a generally centrally located opening. Most preferably, the inner sidewalls 36a, 36b of each of the additional members 32a, 32b bound the sides of the opening 34c, while the outer sidewalls 38a, 38b of the additional members 32a, 32b form one wall of each of the openings 34a, 34b. It is understood that more or less openings and locations or alternative locations can be provided depending on the application without departure from the scope of the present invention. It is further understood that any other profiles or shapes of the opening(s) suitable for minimizing material while still allowing for adequate reinforcement depending on the application is contemplated without departure from the scope of the present invention.

Typically, the at least one pair of first reinforcements 14a, 14b are located adjacent to the opening 15 of the first panel 15. Preferably, the at least one pair of first reinforcements 14a, 14b are located on the side portions 42a, 42b, e.g., generally vertical or upstanding sides with respect to the vehicle installed position, on opposite sides of the opening 15 of the first panel 15. More preferably, the at least one pair of first reinforcements 14a, 14b are connected to the side portions 42a, 42b and the side portions 42a, 42b are rear pillars or rear corner areas. Most preferably, the at least one pair of first reinforcements 14a, 14b are connected to the side portions 42a, 42b and the sides 42a, 42b are the D-pillars or D-pillar areas.

Preferably, the at least one pair of first reinforcements 14a, 14b are substantially mirror images of each other and include at least one end, respectively, 40a, 40b that generally extend toward one another. The end 40a, 40b portions are preferably located at an upper portion 44a, 44b of the pair of first reinforcements 14a, 14b. It is understood that any other profiles or shapes of the at least one pair of first reinforcements 14a, 14b suitable for reinforcement depending on the application is contemplated without departure from the scope of the present invention.

The at least one pair of local reinforcements 16a, 16b, respectively, are connected to the at least one pair of first reinforcements 14a, 14b, respectively. Preferably, the at least one pair of local reinforcements 16a, 16b, respectively, are connected to the upper portion 44a, 44b of the pair of first reinforcements 14a, 14b, respectively. Preferably, the at least one pair of local reinforcements 16a, 16b, respectively, are connected to the upper portion 44a, 44b of the pair of first reinforcements 14a, 14b, respectively. Preferably, the at least one second pair of local reinforcements 16c, 16d, respectively, are connected to a lower portion 46a, 46b of the pair of first reinforcements 14a, 14b, respectively. Generally, the local reinforcements 16a-16d provide reinforcement where needed. Typically, the local reinforcements 16a-16d contribute toward desired properties of the overall structure, e.g., predetermined torsional stiffness, noise, vibration and harshness, etc. Optionally, the first pair of local reinforcements 16a, 16b and/or second pair of local reinforcements 16c, 16d add structure and strength for a mechanism, e.g., liftgate mechanism, strut, gas strut, etc. It is understood that more or less local reinforcements, locations or alternative locations can be provided depending on the application without departure from the scope of the present invention.

Preferably, the local reinforcements 16a-16d are metallic, most preferably, steel. It is understood that non-metal local reinforcements are contemplated depending on the application without departure from the scope of the present invention.

The local reinforcements 16a-16d are connected directly to the pair of first reinforcements 14a, 14b, respectively, in accordance with the present invention; not directly to the first panel 18. Conventional systems use metal reinforcements that are mechanically attached (i.e., rivets, screws, etc.) or overmolded to an inner panel directly. Directly connecting metal reinforcements to the inner panel necessitated, in particular when overmolding to the inner panel directly, the need to make the metal reinforcements larger, which affects weight. In addition, it was not possible to achieve good sectional properties. Poor sectional properties also resulted in having worse properties (i.e., worse noise, vibration and harshness, etc, performance).

Preferably, the local reinforcements 16a-16d are mechanically connected or welded or overmolded directly to the pair of first reinforcements 14a, 14b, respectively. Most preferably, the local reinforcements 16a-16d are overmolded to the pair of first reinforcements 14a, 14b. Overmolding the local reinforcements 16a-16d to the pair of first reinforcements 14a, 14b allows the local reinforcements 16a-16d, which are most preferably metal, to be smaller and improves sectional properties. The properties are also much better, such as to achieve high performance criteria, noise, vibration and harshness (NVH), etc. Typically, the vibration frequency is at least 35 Hertz, preferably, greater than or equal to 40 Hertz, most preferably, greater than 40 Hertz. The predetermined smaller size (or sizes depending on the application) is generally about 5 to 90% smaller than conventional metal reinforcements, typically, at least about 5%, preferably, at least 20%, more preferably, at least 50%, most preferably, at least 75%. The predetermined weight reduction over conventional metal reinforcements is generally about 5 to 75%, than conventional metal reinforcements, typically, at least about 5%, preferably, at least 15%, more preferably, at least 25%, most preferably, at least 35%. It is understood that the size of each local reinforcement 16a-16d is the same or different from each other depending on the application, and minimized for greatest weight reduction while being suitable for other desired properties.

Typically, the pair of first reinforcements 14a, 14b with the connected local reinforcements 16a-16d are infrared welded to the first panel 12. Preferably, the local reinforcements 16a-16d are overmolded to the pair of first reinforcements 14a, 14b and then the pair of first reinforcements 14a, 14b are infrared welded to the inner panel 12. Most preferably, the local reinforcements 16a-16d are overmolded to the pair of first reinforcements 14a, 14b and then the pair of first reinforcements 14a, 14b are infrared welded on the reinforcements' 14a, 14b opposite side to the inner panel 12.

Optionally, a plurality of apertures are provided on the local reinforcements 16a-16d, pair of first reinforcements 14a, 14b, and first panel 12. The plurality of apertures 48, 49 through the local reinforcements 16a-16d and pair of first reinforcements 14a, 14b, and the plurality of apertures 50, 51 through the first panel 12 allow for fasteners to further mechanically secure the components together for additional strength (e.g., apertures 48 align to apertures 50 and apertures 49 align to apertures 51).

Typically, the at least one second reinforcement 18 and the at least one third reinforcement 20 are connected directly to the first panel 12, e.g., mechanically connected and/or welded. Preferably, the at least one second reinforcement 18 is infrared welded to the first panel 12, more preferably, the at least one second reinforcement 18 is infrared welded to the first panel 12 generally at least partially above the opening 15 in the first panel, most preferably, the at least one second reinforcement 18 is infrared welded to the first panel 12 generally at least partially above the opening 15 in the first panel 12 with the pair of first reinforcements 14a, 14b partially sandwiched, e.g., upper portion 44a, 44b, between the first panel 12 and the second reinforcement 18. Preferably, the at least one third reinforcement 20 is infrared welded to the first panel 12, more preferably, the at least one third reinforcement 20 is infrared welded to the first panel 12 generally below the opening 15 in the first panel 12, most preferably, the at least one third reinforcement 20 is infrared welded to the first panel 12 generally below the opening 15 in the first panel 12 with the pair of first reinforcements 14a, 14b partially sandwiched, e.g., lower portion 46a, 46b, between the first panel 12 and the third reinforcement 20.

Optionally, the second reinforcement 18 and/or third reinforcement 20 are additionally infrared welded to the pair of first reinforcements 14a, 14b, respectively, alternatively, mechanically fastened and/or adhered.

Optionally, a plurality of apertures are provided on the at least one third reinforcement 20 and first panel 12. The plurality of apertures 52, 53 through the third reinforcement 20, the plurality of apertures 49 through the pair of first reinforcements 14a, 14b and local reinforcements 16c, 16d, and the plurality of apertures 51 and 54 through the first panel 12 allow for fasteners to further mechanically secure the components together for additional strength (e.g., apertures 49 align to apertures 51 and apertures 52, and apertures 53 align to apertures 54).

Preferably, at least one additional local reinforcement 16e is provided, more preferably, provided on the third reinforcement 20, most preferably, provided at the shorter member 28 portion of the third reinforcement 20. The shorter member 28 is preferably a latch area for the assembly. Preferably, the additional local reinforcement 16e is metal, preferably, steel. The local reinforcement 16e is connected directly to the third reinforcement 20. Preferably, the local reinforcement 16e is mechanically connected or welded or overmolded directly to the third reinforcement 20. Most preferably, the local reinforcement 16e is mechanically connected to the third reinforcement 20. At least one aperture 56 is provided to connect the local reinforcement 16e to the third reinforcement, and optionally to the inner panel 12, with at least one fastener.

Typically, the first panel 12 and the pair of first reinforcements 14a, 14b are thermoplastic, generally, reinforced propylene, preferably, fiber filled propylene, more preferably, glass fiber reinforced propylene or glass filled polypropylene, most preferably, long fiber reinforced propylene. Typically, the second reinforcement 18 and/or third reinforcement 20 are thermoplastic, generally, reinforced propylene, preferably, fiber filled propylene, more preferably, glass fiber reinforced propylene, most preferably, long fiber reinforced propylene. It is understood that any alternative material suitable for reinforcement and predetermined properties depending on the application are contemplated without departure from the scope of the present invention.

The liftgate assembly 10 includes at least one outer panel, preferably, at least two outer panels, more preferably, at least one first outer panel 58, e.g., most preferably an upper outer panel, and at least one second outer panel 60, e.g., most preferably an outer lower panel. Preferably, the upper outer panel 58 is a spoiler. Preferably, the outer lower panel 60 and upper outer panel 58 have finished show surfaces. The at least one upper outer panel 58 is connected to the at least one second reinforcement 18, by adhesive bonding, mechanical, and/or infrared welding, most preferably, the upper outer panel 58 is adhesive bonded to the second reinforcement 18. The at least one lower outer panel 60 is connected to the at least one third reinforcement 20, most preferably, by adhesive bonding, mechanical, and/or infrared welding, most preferably, the upper lower outer panel 60 is adhesive bonded to the third reinforcement 20.

In accordance with a most preferred aspect of the present invention, the liftgate assembly includes the first panel 12, most preferably, that is an inner panel; the pair of first reinforcements 14a, 14b; the two pairs of local reinforcements 16a-16d overmolded to the pair of first reinforcements 14a, 14b; the second reinforcement 18 that is a first outer panel reinforcement and is infrared welded to the first panel 12 generally above the opening 15 of the first panel 12; the third reinforcement 20 that is a second outer panel reinforcement and is infrared welded to the first panel 12 generally below the opening 15. The pair of first reinforcements 14a, 14b with the local reinforcements 16a-16d overmolded thereto are also infrared welded to the first panel 12 generally at the sides, e.g., indicated at 42a, 42b, of the opening 15. The local reinforcements 16a-16d are metal, preferably, steel. The first outer panel 58, preferably, a spoiler with a finished show surface, is adhesive bonded to at least the second reinforcement 18, and, the second outer panel 60, preferably, a lower outer panel with a finished show surface, is adhesive bonded to at least the third reinforcement 20, respectively. The additional local reinforcement 16e is mechanically connected or infrared welded to the third reinforcement 20, preferably, connected by at least one fastener. Each of the features in this paragraph are set forth in greater throughout this application. It is understood that overmolding the local reinforcements 16a-16d to the pair of first reinforcements 14a, 14b allows the metal local reinforcements 16a-16d to be smaller, which improves weight and sectional properties. The properties are also much better, such as, by way of example, to achieve high performance criteria, noise, vibration and harshness (NVH), etc. Typically, the vibration frequency is at least 35 Hertz, preferably, greater than or equal to 40 Hertz, most preferably, greater than 40 Hertz.

Referring now more particularly to FIGS. 2B-8B, in general, several cross sections through the assembly are depicted. It is understood that alternative cross sections depending on the application are contemplated without departure from the scope of the present invention. It is well known that various vehicle models, platforms, OEMs, requirements, performance requirements, standards and accessories can affect space, dimensions, shapes, pillars, sectional parameters, etc. Welding (most preferably, infrared welding) locations are indicated at 62 (series of "x"s), tape is indicated at 64 and additional adhesive is indicated at 25, for the illustrative cross sections. It is understood, however, that more or less and any alternative bonding locations and part profiles and locations and configurations are contemplated depending on the application without departure from the scope of the present invention.

Figures 2A, 2B:
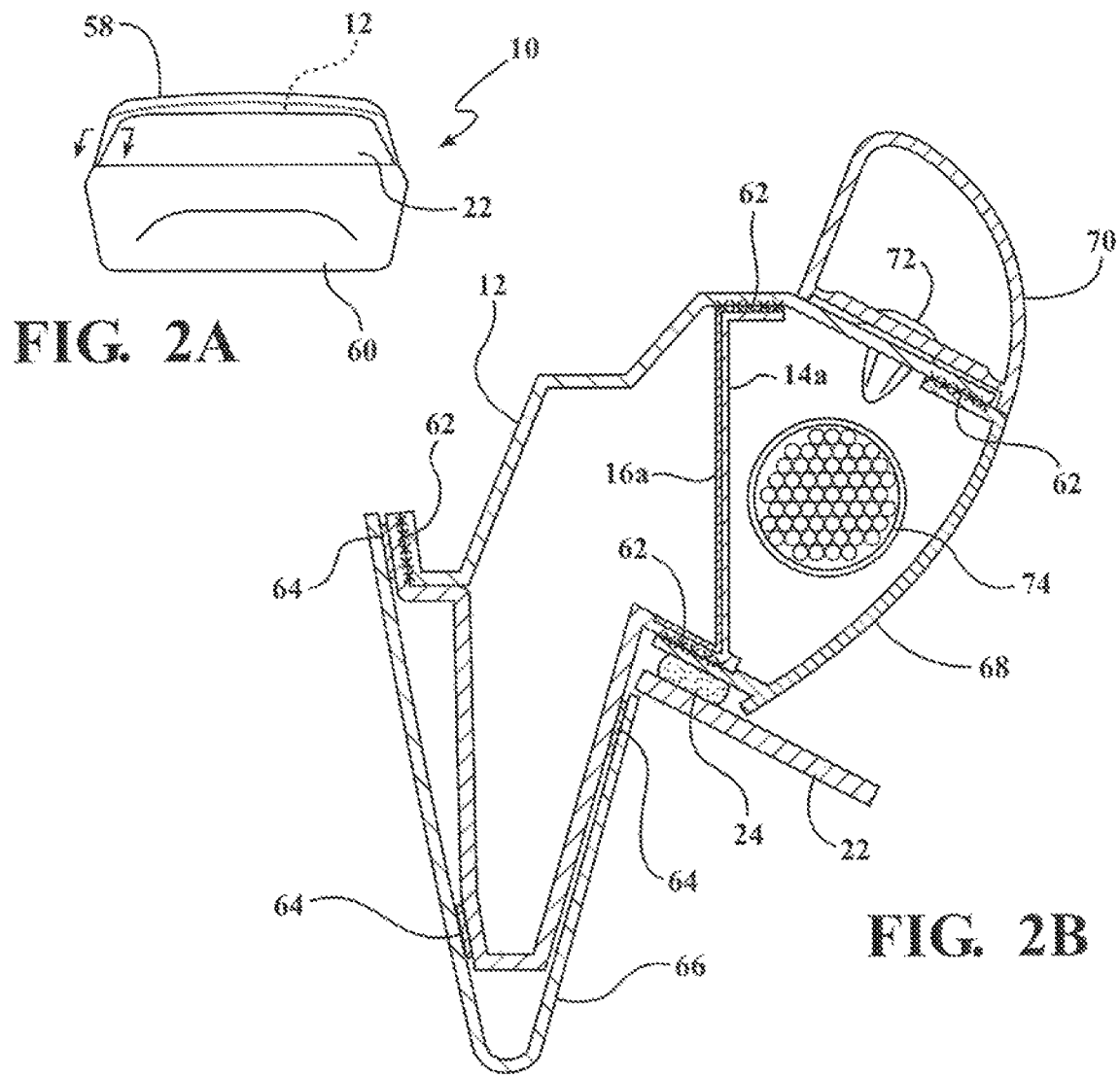
FIG. 2A is a rear elevation view of a liftgate assembly, in accordance with the present invention.
FIG. 2B is a sectional view taken at FIG. 2A illustrating a local reinforcement overmolded to a first reinforcement panel that is connected to a first panel, in accordance with the present invention.
Figure 3A:
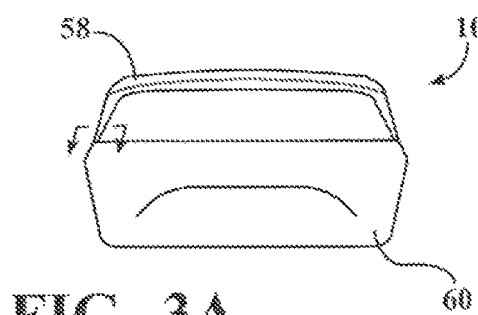
FIG. 3A is a rear elevation view of a liftgate assembly, in accordance with the present invention.
Figure 3B:
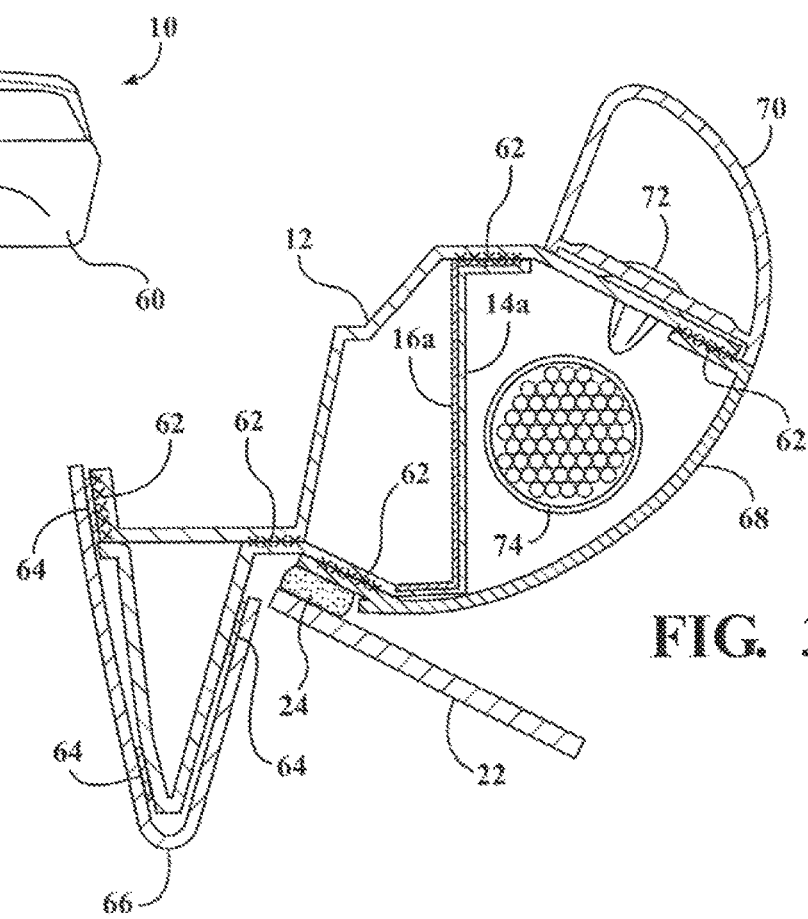
FIG. 3B is a sectional view taken at FIG. 3A illustrating the local reinforcement overmolded to the first reinforcement panel that is connected to the first panel, in accordance with the present invention.

At least one winglet 66 is preferably provided. The at least one winglet 66 is preferably connected using the tape 64, preferably, which is double sided tape. FIGS. 2B and 3B cross sections, for example, illustrate the winglet 66 connected to at least the first reinforcement 14a in two locations using two sections of tape 64 that is double sided, and at a location where the first reinforcement 14a and first panel 12 are infrared welded 62 using a third section of tape 64 that is double sided.

Typically, at least one trim part is provided, preferably, an inner trim, most preferably, a side inner trim 68 and a trim inner 70 which are operably connected to the assembly 10, preferably, to at least the first panel 12. The side inner trim 68 is preferably integrated or incorporated with or connected to (e.g., welded, infrared welded, etc.) the first panel 12 in at least one location. FIGS. 2B and 3B cross sections, for example, depict a side inner trim 68 welded, e.g., infrared welded, to at least the first panel 12, most preferably an inner panel, and to the first reinforcement 14a, and bonded with adhesive 24 to the window 22. FIGS. 2B and 3B cross sections, for example, also depict a trim inner 70 connected to the first panel 12 with at least one fastener 72.

The local reinforcements are overmolded to the side reinforcements and infrared welded to the first panel. Preferably, local reinforcement 16a is overmolded to the first reinforcement 14a and infrared welded to the first panel 12 in at least one location, preferably, infrared welded to the first panel 12 in at least two locations, and to the side inner trim 68. FIGS. 2B and 3B cross sections, for example, depict the local reinforcement 16a overmolded to the first reinforcement 14a and infrared welded to the first panel 12 in at least two locations and to the side inner trim 68 in at least one location.

At least one wire harness 74 is located in the space provided between components. Preferably, the wire harness 74 is located between the first panel 12, first reinforcement 14a, and side inner trim 68.

Figure 4A:
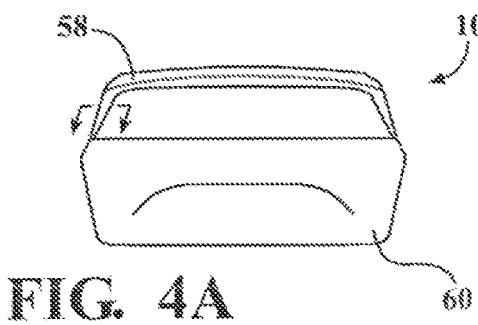
FIG. 4A is a rear elevation view of a liftgate assembly, in accordance with the present invention.
Figure 4B:
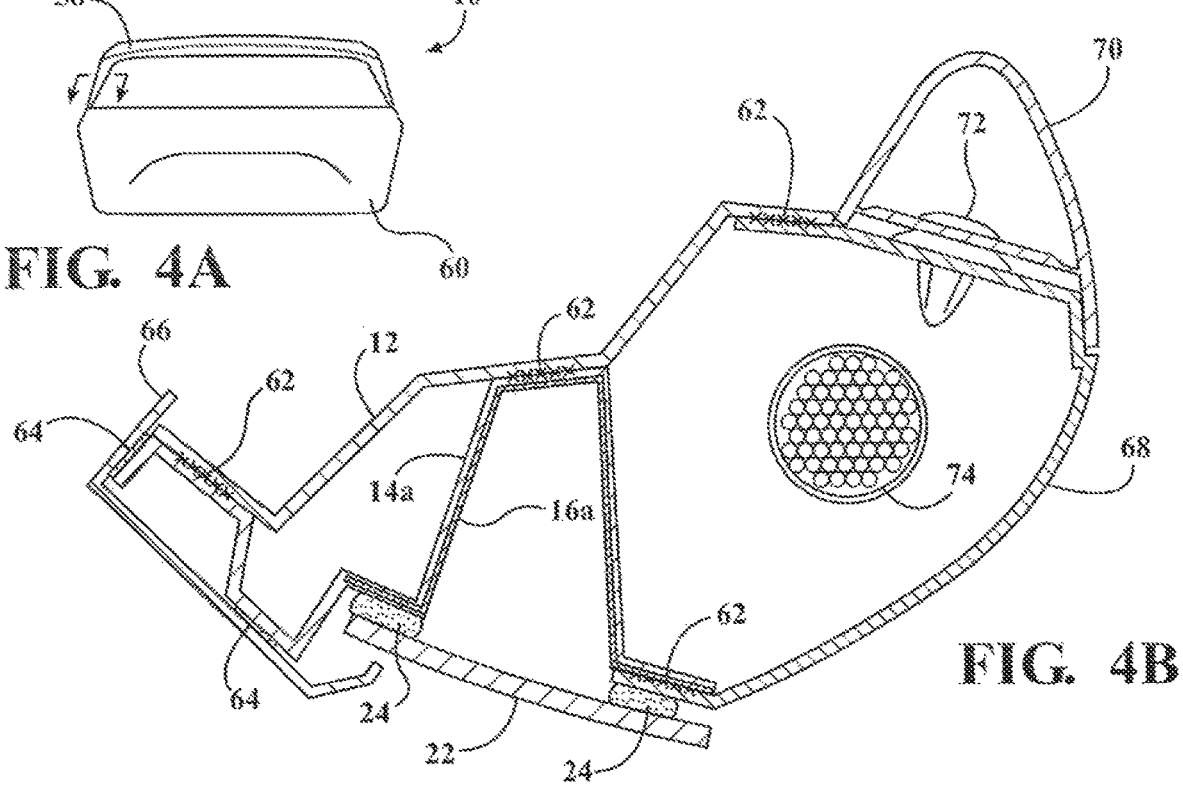
FIG. 4B is a sectional view taken at FIG. 4A illustrating the local reinforcement overmolded to the first reinforcement panel that is connected to the first panel, in accordance with the present invention.

Referring further to FIG. 4B generally, there is depicted the local reinforcement 16a overmolded to the first reinforcement 14a. The first reinforcement 14a is adhered 24 to the window 22 and connected, preferably, infrared welded, to the side inner trim 68. The first reinforcement 14a is also infrared welded to the inner panel 12 in at least two locations. The winglet 66 is connected to the first reinforcement 14a, preferably, connected by tape 64, most preferably, by tape 64 in at least two locations that is double sided tape. It is understood that more or less and any alternative bonding locations, infrared locations, and part profiles, locations and configurations are contemplated depending on the application without departure from the scope of the present invention.

Figure 5A:
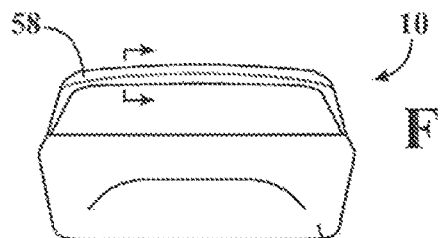
FIG. 5A is a rear elevation view of a liftgate assembly, in accordance with the present invention.
Figure 5B:
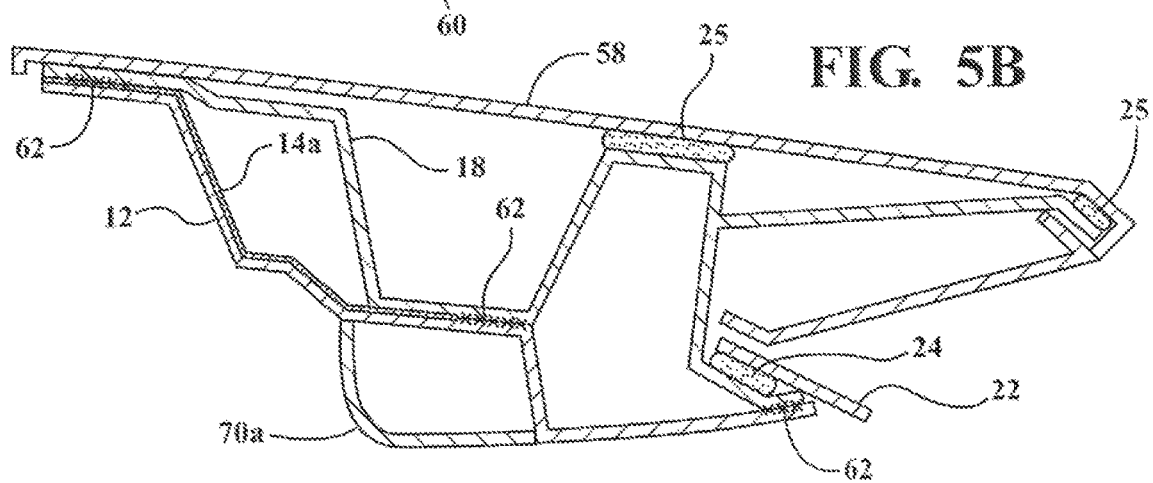
FIG. 5B is a sectional view taken at FIG. 5A illustrating the first reinforcement panel and a second reinforcement connected to the first panel and the second reinforcement panel connected to a first outer panel, in accordance with the present invention.

Referring further to FIG. 5B generally, there is depicted the first reinforcement 14a infrared welded 62 to the inner panel 12 in at least two locations, and the second reinforcement 18 infrared welded 62 to the inner panel 12 in at least two locations. Most preferably, the two locations of the infrared welding 62 connect the first reinforcement 14a and second reinforcement 18 at aligned areas on the first panel 12. First reinforcement 14a is also adhered 24 to the window 22. The first reinforcement 14a is adhered 25 to the first outer panel 58, preferably, a spoiler, in at least two locations. It is understood that more or less and any alternative bonding locations, infrared locations, and part profiles, locations and configurations are contemplated depending on the application without departure from the scope of the present invention. An inner trim upper 70a is coupled to the first panel 12.

Figure 6A:
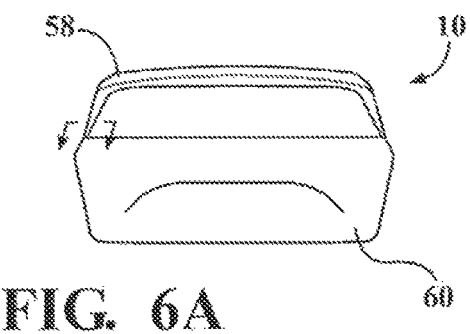
FIG. 6A is a rear elevation view of a liftgate assembly, in accordance with the present invention.
Figure 6B:
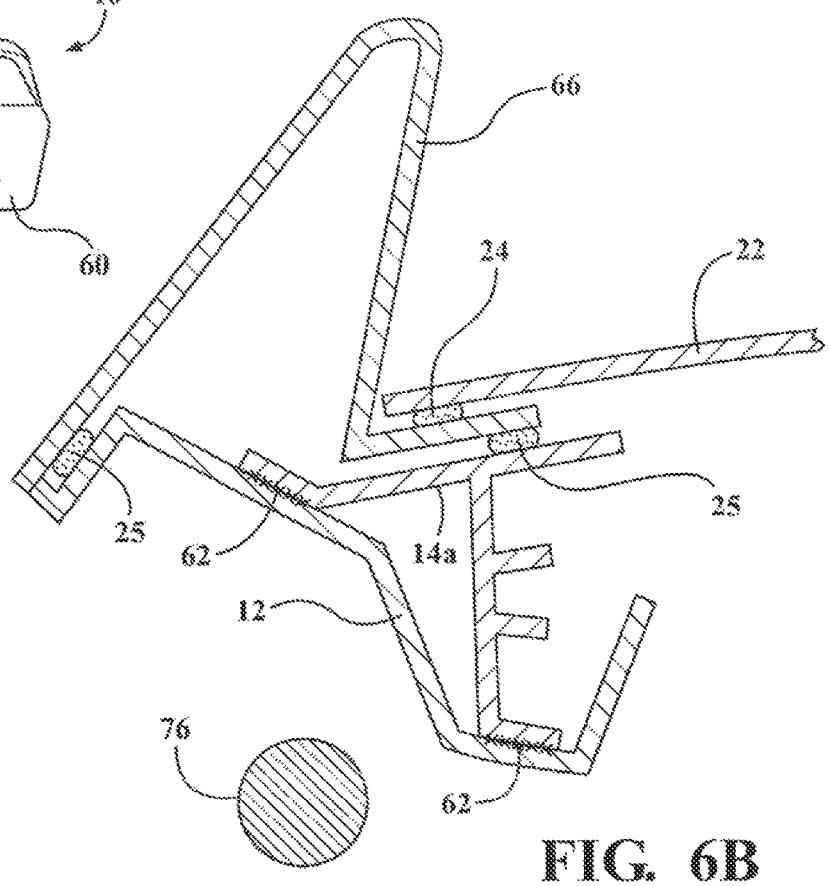
FIG. 6B is a sectional view taken at FIG. 6A illustrating the first reinforcement panel connected to the first panel, in accordance with the present invention.

Referring further to FIG. 6B generally, there is depicted the winglet 66 adhered 24 to the window 22, adhered 25 to the first panel 12, and adhered 25 to the first reinforcement 14a. The first reinforcement 14a is infrared welded 62 in at least two locations to the first panel 12. It is understood that more or less and any alternative bonding locations, infrared locations, and part profiles, locations and configurations are contemplated depending on the application without departure from the scope of the present invention. A gas strut 76 for the assembly 10 is indicated at 76.

Referring further to FIG. 7B generally, there is depicted the second reinforcement 18, preferably, an upper reinforcement, infrared welded 62 to the inner panel 12, preferably, an inner panel, in at least three locations. The second reinforcement 18 is adhered 25 to the first outer panel 58, preferably, a spoiler, in at least four locations. A first outer panel inner 58a, preferably, a spoiler inner, is adhered 24 to the window 22 and is adhered 25 to the second reinforcement 18. A door seal 78 is also depicted. It is understood that more or less and any alternative bonding locations, infrared locations, and part profiles, locations and configurations are contemplated depending on the application without departure from the scope of the present invention.

Referring further to FIG. 8B generally, there is depicted the local reinforcement 16a overmolded to the first reinforcement 14a, preferably, side reinforcement. The first reinforcement 14a is infrared welded to the first panel 12, preferably, inner panel, in at least three locations. The second reinforcement 18, preferably, upper reinforcement, is infrared welded 62 to the inner panel 12 in at least three locations; most preferably, at least two of these locations substantially align with the infrared welding 62 locations of the first reinforcement 14a and first panel 12. The second reinforcement 18 is adhered 25 to the first outer panel 58, preferably, a spoiler, in at least four locations. A first outer panel inner 58a, preferably, a spoiler inner, is adhered 24 to the window 22 and is adhered 25 to the second reinforcement 18. The door seal 78 is also depicted. A door hinge 80, e.g., liftgate door hinge, is generally shown at 80. It is understood that more or less and any alternative bonding locations, infrared locations, and part profiles, locations and configurations are contemplated depending on the application without departure from the scope of the present invention.

In further regard to FIGS. 2A-8B, it is understood that the right hand cross sections are preferably substantially mirror image to the left hand side cross sections illustrated.

The first panel 12 and/or reinforcements, e.g., 14a, 14b, and/or 18 and/or 20, is/are thermoplastic, most preferably, glass reinforced polypropylene. However, any predetermined material suitable for infrared welding is contemplated, including, but not limited to, composites, SMC, non-filled thermoplastic polyolefin (TPO) parts, TPO parts with Class A surface(s), painted parts, molded-in color parts, TPO material with painted Class A surface(s), material sensitive to read through, heat sensitive material, structural thermoplastic, polypropylene-based materials, a thermoset or thermoplastic such as a reinforced polypropylene (RPP), glass-filled polypropylene, etc.

The present invention provides several benefits over conventional systems, including, but not limited to, that the invention is more stiff than known gluing solutions; is a quicker process than gluing processes; weight reduction (equal to or less than adhesive weight); even better D-pillar design space utilization than steel solution (having impact to torsional stiffness); improvement in dimension and shape accuracy; can be thinner outer panels than required for adhesive thicknesses because of higher accuracy (additional weight reduction); even overmolded steel reinforcements can be welded; overmolded steel reinforcements help at high temperature; improvement of Modal frequency behavior; lower welding equipment cost for high volume production (compared to gluing); meets crash performance requirements; accomplishment of all OEM required stiffness performance and other criteria.

Referring now to FIGS. 9-11 generally, the method in accordance with the present invention for manufacturing the assembly 10 according to any aspect of the present invention will now be described in further detail. Rather than adhesive bonding components or mechanically connecting components, which is conventional, the present invention also incorporates overmolding and infrared welding. In addition, local reinforcements are overmolded to reinforcements, rather than connecting local reinforcements directly to an inner panel, which has significant advantages and superior results over conventional systems, as set forth previously. It is understood that the geometries and profiles of the parts, nesting structure and infrared welding fixture are exemplary only and that any others are contemplated depending on the application without departure from the scope of the present invention.

The first panel 12, preferably, an inner panel is provided. The at least one first reinforcement 14a, preferably, at least the one pair of first reinforcements 14a, 14b are provided.

The at least one of the second reinforcements 18 and the at least one of the third reinforcements 20 are also provided. The at least one local reinforcement 16a is provided, preferably, at least two pairs of local reinforcements 16a-16d. It is essential that the local reinforcements 16a-16d are not connected directly to the first panel 12. The next step is overmolding of at least one local reinforcement to at the least one first reinforcement 14a. Preferably, the local reinforcements, e.g., 16a-16d, are overmolded to the first pair of reinforcements 14a, 14b. The additional local reinforcement 16e is connected, e.g., mechanically, to the third reinforcement 20. Optionally, the additional local reinforcement 16e is instead overmolded to the third reinforcement 20.

There is provided a first nest 100 for the first panel 12, most preferably, an inner panel, and at least one second nest 104 for at least one reinforcement, e.g., first reinforcement(s) 14a, 14b, and/or second reinforcement(s) 18, and/or third reinforcement(s) 20. The first nest 100 is fabricated to hold the first panel 18 (e.g., inner panel of the liftgate subassembly). The second nest 104 is fabricated to hold at least one of the reinforcements. FIG. 10 illustrates the second nest 104 holding the first reinforcement 14a. It is understood that more than one of the reinforcements can be held in the second nest 104. It is also understood that multiple nests can be used each corresponding to the respective reinforcements, e.g., at least one nest structure accommodating the first pair of reinforcements 14a, 14b, nest structure accommodating the second reinforcement 18, nest structure accommodating the third reinforcement 20 and any combinations thereof.

At least one of the nests 100, 104 moves to a clamping position. Preferably, both the first nest 100 and the second nest 104 are moveable to come into operational engagement with each other and with an infrared fixture shown generally at 116. At least one controller or electronic control unit 123 is in operational communication, e.g., hard wired or wireless, with the infrared fixture 116 and plurality of nests 100, 102, etc.

The nests are preferably aluminum, preferably, the first and second nests 100, 104 have a polished surface, which provides the advantage of allowing ease of removal of panels from the molds when desired. Alternatively, a urethane or silicon film could be applied to the nests for easier removal of the panels from the nests.

Optionally, at least the first panel 102 can be molded with higher packing pressure to reduce rib trace.

The process includes the steps of loading the first panel 102 into the first nest 100, and then loading at least one reinforcement, preferably the pair of first reinforcements 14a, 14a, into the second nest 104. Preferably, loading the reinforcement is done by vacuum. In particular, the pair of first reinforcements 14a, 14a are placed onto predetermined locations on the first panel 102 sitting in the first nest 100. The second nest 104 is then brought into contact with the pair of first reinforcements 14a, 14a and vacuum is applied to hold the pair of first reinforcements 14a, 14a when the second nest 104 is moved away from the first nest 100. These vacuum forces can also be turned off/on when desired depending on the stage(s) in the process. Optionally, a part check fit is performed with the panel and reinforcements contacting the respective nests to make sure the parts are properly aligned.

The nests 100, 104 are then separated from each other while still holding their respective parts.

At least one infrared welding fixture 116 with a plurality of infrared heat sources 118 and 120 is brought into infrared weldable proximity with the first panel 12 and first pair of reinforcements 14a, 14b held in the first and second nests 100, 104, respectively. The infrared heat sources 118 and 120 are a predetermined distance from predetermined weld surfaces 108 of the panel 12 and reinforcements 14a, 14b. Generally, the infrared heat sources 118, 120 distance to the respective panels 12, 14a, 14b is generally less than 5 inches, typically, less than 20 millimeters, preferably, 3-18 mm; more preferably, 8 to 12 mm; most preferably, about 10.5 mm. Greater or lesser distances are contemplated depending on the application without departing from the scope of the present invention. It is understood that the weld surfaces 108 depicted are intended to be exemplary and any alternative suitable surfaces are contemplated depending on the application without departure from the scope of the present invention The predetermined locations of the plurality of infrared heat sources 118, 120 generally corresponds to the particular liftgate components to be welded and desired weld locations. The plurality of infrared heat sources 118, 120 are used to heat the predetermined weld surfaces a predetermined amount of time and amount suitable for infrared welding the parts panel 12 and reinforcements 14a, 14b together (and the panel 12 and second reinforcement 18 together, and the panel 12 and third reinforcement 20 together).

The heat sources 118, 120 are bulbs, wires, spoils, mirror-welding metal hot plates, plaques, foils, vertical foils, horizontal foils, single glass bulb tubes, double glass bulb tubes, quartz glass bulb tubes, meal foils or any combinations thereof. It is understood that any alternative heat sources 118, 120 suitable for infrared welding are contemplated depending on the application without departure from the scope of the present invention.

Once the plurality of heat sources 118, 120 are positioned for infrared welding, the targeted panel/reinforcement areas are heated (as indicated by waves 121, 124 in FIG. 11) for a predetermined time to a predetermined temperature. The heating source power is preferably 100%. Greater or lesser power percentage is contemplated without departing from the scope of the present invention. The heating time is generally greater than 2 seconds; typically, greater than 6 seconds; preferably, greater than 8.5 seconds; more preferably 6-9 seconds; most preferably 15 seconds or less.

There is about 1 millimeter of melt when the first panel 12 and reinforcements 14a, 14b are heated. More or less melt is contemplated without departing from the scope of the invention.

Optionally, the first panel 12 and reinforcements 14a, 14b are held in place after heating. Holding time is generally greater than 2 seconds; typically, greater than 4 seconds, preferably, greater than 6.5 seconds; most preferably 4-7 seconds. Greater or lesser heating time or holding time is contemplated without departing from the scope of the present invention. The heating and holding times can be factors that affect weld strength.

The heating temperature(s) generally depends on the panel material, dimensions and show surfaces. Depending on the parameters, about 180° degrees for melting the material. However, the temperature is higher or lower depending on the application without departure from the scope of the present invention. The infrared heat sources 118, 120 heating temperatures can be the same or different, preferably different, e.g., about 120-150° C. difference. The heating temperatures of the first panel 12, first pair of reinforcement 14a, 14b, 18, 20 can be the same or different, e.g., depending on the particular application, materials and geometries. Preferably, the heat is as low as possible for any panel having a finished show surface, e.g., not exceed about 50° C. on the finished part surface to prevent read through to the finished part surface.

The infrared heat sources 118, 120 are preferably medium wave length infrared sources. Generally, the peak is less than about 3 μm. Typically, about 2 to 3 μm. This is a compromise on radiation intrusion into the material and maximum absorption on the surface. This is based on the material research of FTIR spectra and the optical depth of penetration. The main purpose is to heat only the targeted surface as quickly as possible and leave the rest of the material as cold as possible.

Thereafter the infrared welding fixture 116 is moved out of the way and the nests 100, 104 are brought together under pressure for compression performed by the first and second nests 100, 104 (see FIG. 10) to join the first panel 12 and reinforcement, e.g., first reinforcement 14a, at infrared weld 62. Generally, the clamping or mating force is less than 20 kilonewton; typically, 2 to 15 KN; preferably, 5 to 10 KN; most preferably, about 7.5 KN. Greater or lesser mating force is contemplated without departing from the scope of the present invention.

Generally, the clamping time is greater than 5 seconds; typically, greater than 8 seconds, preferably, 9-20 seconds; more preferably about 11 seconds; most preferably about 5-10 seconds. Greater or lesser clamping time is contemplated without departing from the scope of the present invention. Generally, the clamping pressure is greater than 5; typically, less than 50; preferably, 5 to 30; most preferably, about 7.5. Greater or lesser clamping pressure is contemplated without departing from the scope of the present invention.

The weld that results is most preferably about 0.2 to 0.4 mm deep. This is significant as not only does the infrared welding according to the present invention connect two or more parts together—but it can also eliminate the need for adhesives or sealants for those infrared welded panels.

Preferably, the welded together first panel 102 and first pair of reinforcements 14a, 14b are allowed to cool somewhat in the nest for about 5 to 8 seconds before removing the joined parts from the nests 102, 104. Alternatively, forced coolant is contemplated without departure from the scope of the present invention.

The first and second nests 102, 204 are then separated, and the process is repeated for any remaining reinforcements in the same or different nests. (e.g., second reinforcement 18 and/or third reinforcement 20 infrared welded to at least the first panel 12). Typically, at least one other tool nest is provide similarly as depicted in FIGS. 10-11 for the second reinforcement and/or third reinforcement. Preferably, the other tool nest holds both the second and third reinforcement similarly as depicted in FIGS. 10-11. Optionally, the other tool nest holds the second reinforcement and another tool nest holds the third reinforcement, similarly as depicted in FIGS. 10-11. If the same tool nest holds both the second and third reinforcements 18, 20, these can be held at the same time or different times in the tool nest depending on the application. By way of example, weld surfaces of the first panel and second and third reinforcements 18, 20 can be heated simultaneously by the infrared welding fixture 116 and then pressed together at the same time for creating welds similarly as depicted in FIG. 10. Alternatively, the second or third reinforcement 18, 20 can be heated and welded first, followed by the other of the second or third reinforcements 18, 20. Once all the desired reinforcements are infrared welded in place, the subassembly 11 is either removed from the first nest 102 or further assembly is performed in the nest (e.g., adhering outer panel(s) to the assembly 10).

The first and second outer panels 58, 60 are adhesive bonded to the first panel 12. Alternatively, the first and/or second outer panels 58, 60 are infrared welded to the first panel 12, using compatible nests and an infrared heating fixture.

The entire cycle time is much faster than conventional bonding, which can take about 8 minutes. Generally, the total infrared welding cycle time of the present invention is 5 minutes or less, typically, 4 minutes or less, preferably, 3 minutes or less, more preferably, 2.5 minutes or less, most preferably, 2.25 minutes or less. Thus instead of one part every 8 minutes, the present invention can weld together a plurality of panels in that same time. Adhesives for example stay soft for a much longer time. Furthermore, if a warp (or other tolerance variation) was present before bonding, that warp remains even after bonding because there is permanent stress on the joint (shear stresses in the joint, creep in the joint, etc).

It is understood that there are several process and design variables taken into consideration. Exemplary processing and design variables include, temperature, heating time, emitter distance, clamping pressure, press speed, hold time, cooling, components, show surfaces, etc, part material(s), part geometry, e.g., joint area geometry being flat, ribs, etc., part warpage (maximum), weld flange thickness (optimal), and weld interference (optimal), etc.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A liftgate assembly for a vehicle, comprising:
   at least one local reinforcement overmolded directly to one side of at least one first reinforcement, said at least one first reinforcement extending substantially vertically adjacent to and along at least one side of a window opening;
   at least one second local reinforcement overmolded directly to said one side of said at least one first reinforcement at a lower portion of said at least one first reinforcement adjacent a bottom of the window opening;
   at least one first panel, said at least one first reinforcement infrared welded to said at least one first panel;
   at least one outer panel operably coupled to said at least one first panel, said at least one outer panel including a finished show surface;
   wherein the at least one local reinforcement is metallic;
   at least one second reinforcement infrared welded to said at least one first panel substantially above the window opening in the at least one first panel, said window opening provided for a rear window; and
   at least one third reinforcement infrared welded to said at least one first panel substantially below said window opening in the at least one first panel;
   wherein said at least one outer panel comprises a first panel that is an upper outer panel adhesive bonded to said at least one second reinforcement and a second panel that is a lower outer panel adhesive bonded to said at least one third reinforcement.

2. The liftgate assembly of claim 1, wherein said at least one local reinforcement is at least one pair of local reinforcements, and wherein said at least one first reinforcement is at least one pair of reinforcements.

3. The liftgate assembly of claim 2, wherein said at least one pair of first reinforcements is infrared welded to said at least one first panel substantially at opposite sides of the window opening in said at least one first panel, said window opening provided for a window glass.

4. The liftgate assembly of claim 2, wherein said at least one pair of first reinforcements are infrared welded to said at least one first panel in a D-pillar area of said vehicle, wherein sectional properties in said D-pillar area achieves vibration frequency requirements of at least 40 Hertz.

5. The liftgate assembly of claim 2, further comprising at least one additional reinforcement infrared welded to said at least one first panel.

6. The liftgate assembly of claim 2, wherein said at least one second local reinforcement is a second pair of local reinforcements overmolded to said at least one pair of first reinforcements.

7. The liftgate assembly of claim 6, wherein said at least one pair of local reinforcements and second pair of local reinforcements are located toward an upper portion and toward a lower portion of said at least one pair of reinforcements, respectively.

8. The liftgate assembly of claim 1, further comprising at least one second reinforcement infrared welded to said at least one first panel substantially above said window opening in the at least one first panel, said opening provided for a rear window.

9. The liftgate assembly of claim 1, further comprising at least one additional reinforcement infrared welded to said at least one first panel substantially below said window opening in the at least one first panel, said opening provided for a rear window.

10. The liftgate assembly of claim 9, further comprising an additional local reinforcement mechanically connected or overmolded to said additional reinforcement, wherein the location for said additional local reinforcement is a latch area.

11. The liftgate assembly of claim 10, wherein said additional reinforcement includes a plurality of openings without material for weight reduction.

12. The liftgate assembly of claim 1, wherein the at least one first panel and/or the at least one reinforcement is/are a glass filled reinforced polypropylene.

* * * * *